L. HOSKINS.
VEHICLE WHEEL.
APPLICATION FILED FEB. 6, 1911.
1,032,064.
Patented July 9, 1912.
3 SHEETS—SHEET 2.
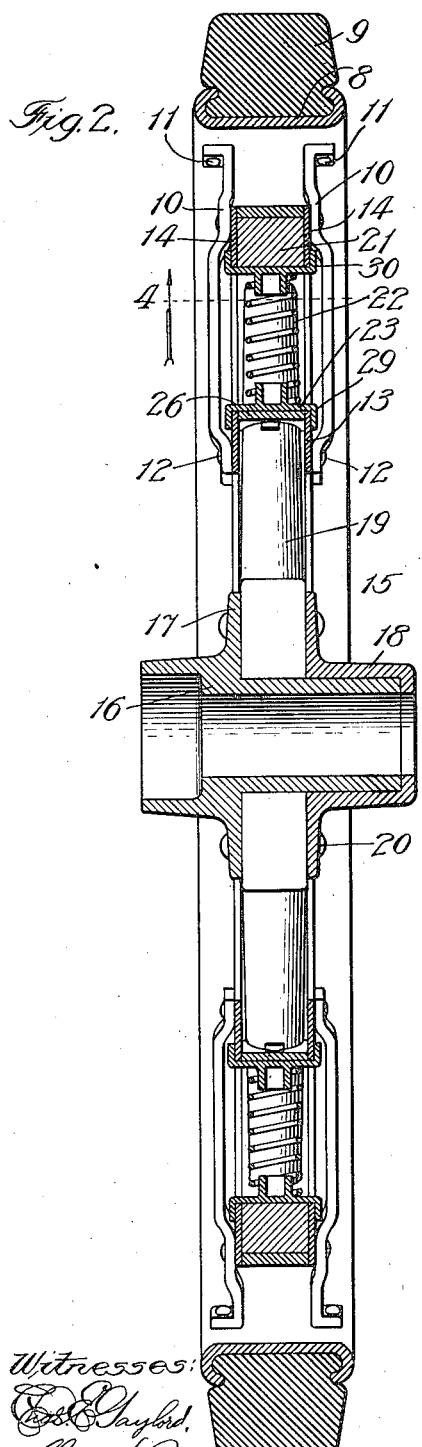
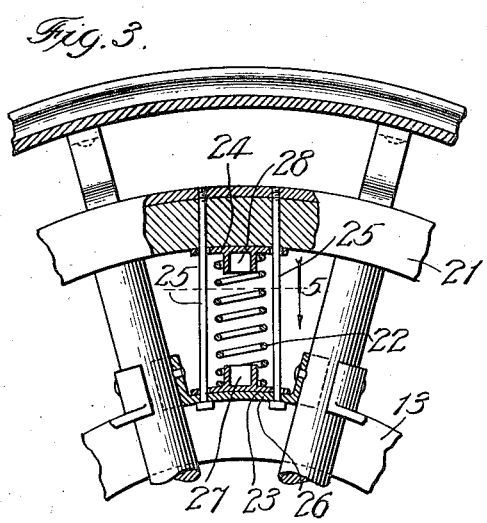
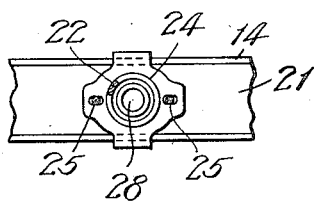
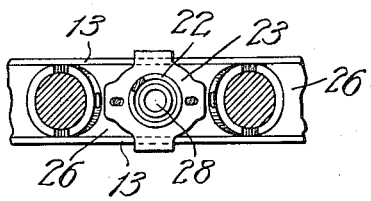
Witnesses
Inventor:
Lawrence Hoskins.
By Dyrenforth, Lee, Chritton & Wiles
Attys.

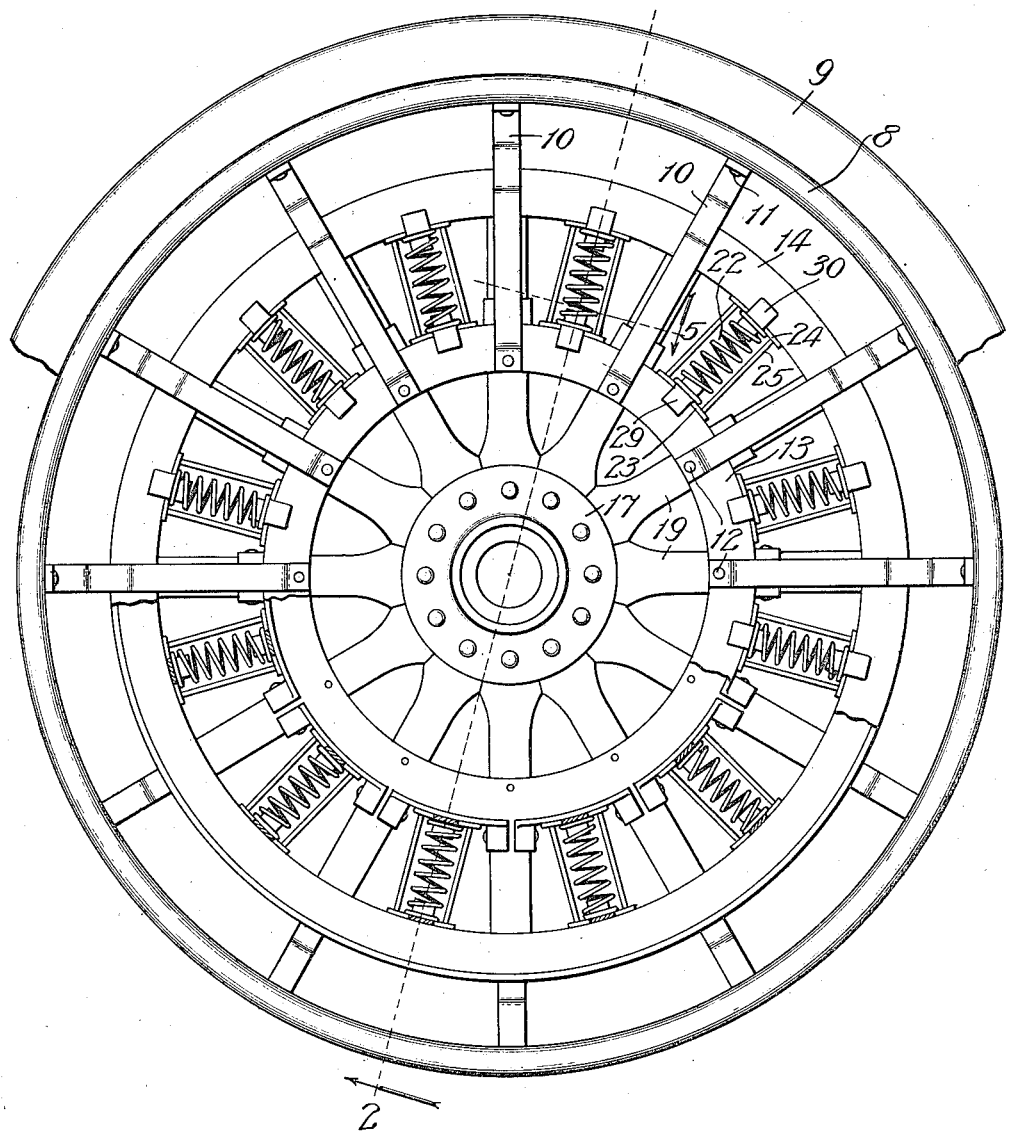

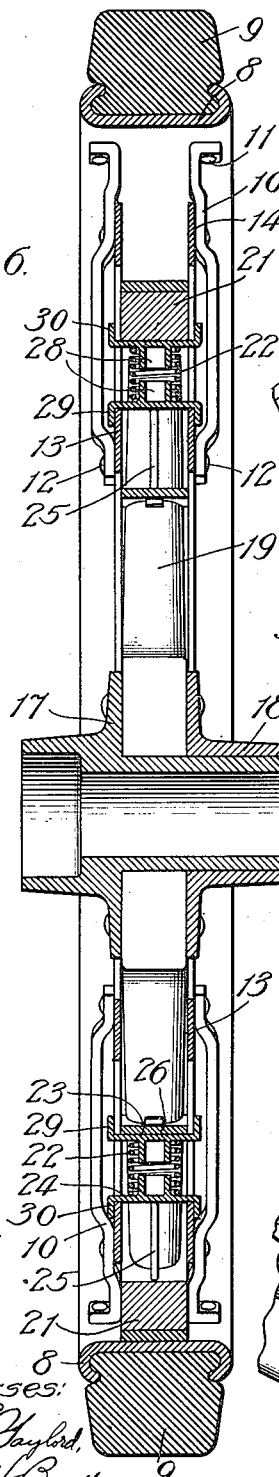
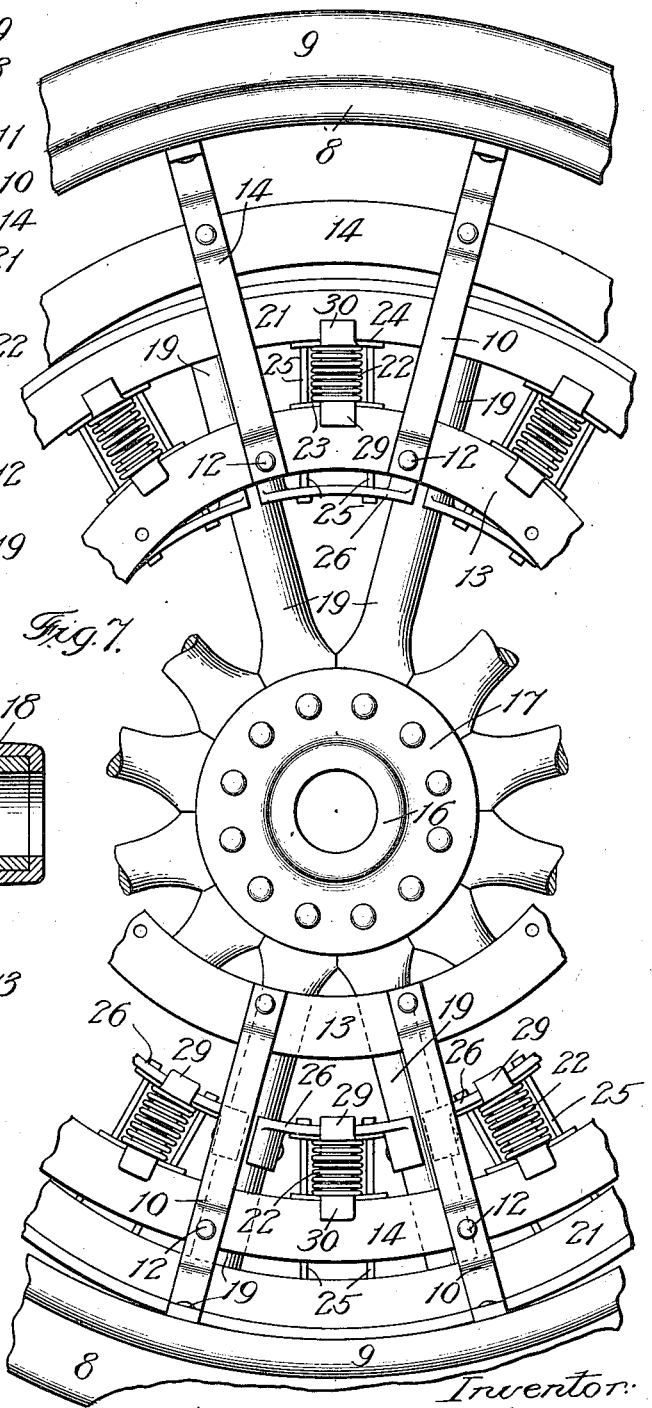

UNITED STATES PATENT OFFICE.

LAWRENCE HOSKINS, OF PLAINVILLE, ILLINOIS

VEHICLE-WHEEL.

1,032,064.　　　　Specification of Letters Patent.　　Patented July 9, 1912.

Application filed February 6, 1911. Serial No. 606,908.

*To all whom it may concern:*

Be it known that I, LAWRENCE HOSKINS, a citizen of the United States, residing at Plainville, in the county of Adams and State of Illinois, have invented a new and useful Improvement in Vehicle-Wheels, of which the following is a specification.

My invention relates to improvements in wheels of the type in which the hub-portion thereof is yieldingly supported on the rim of the wheel through the medium of springs for rendering the wheel resilient.

My primary object is to provide a simple construction of wheel of the type above referred to which shall be sufficiently sensitive in its action to absorb shocks in passing over rough roads, be rigid and durable, and present the advantages, without the disadvantages, of pneumatic tires.

Another object is to provide a construction of wheel in which the springs both above and below the hub, as well as the intermediate springs, shall be similarly actuated and preferably compressed in the operation of the wheel, thereby eliminating means for fastening the springs to the rim and hub, of a character which, in the action of the springs, causes certain portions of the springs to bend back and forth with relation to other integral portions thereof and thus produce crystallization and consequent impairment of the springs.

Referring to the accompanying drawings—Figure 1 is a view in side elevation of a wheel embodying my invention, portions thereof being broken away the better to disclose interior details of construction. Fig. 2 is an enlarged section taken at the line 2 on Fig. 1 and viewed in the direction of the arrow. Fig. 3 is a view in elevation of a section of the wheel of Fig. 1 showing portions thereof in section. Fig. 4 is a section taken at the line 4 on Fig. 2 and viewed in the direction of the arrow. Fig. 5 is a section taken at the line 5 on Fig. 1 and viewed in the direction of the arrow. Fig. 6 is a view like Fig. 2 showing the springs of the wheel compressed; and Fig. 7 is a broken face view of the wheel of Fig. 1 showing the position the parts thereof assume when the springs are compressed.

The rim of the wheel which is represented at 8 is shown of a form for receiving and holding a cushion-tire represented at 9, though the rim, as will be readily understood, so far as my invention is concerned, need not be equipped with a yielding tire. The rim 8 carries radially and inwardly extending bars 10 which are arranged on both sides of the rim to afford pairs thereof, the members of which are spaced apart as represented in Fig. 2, these bars being connected with the inner periphery of the rim, as by rivets 11. The inner ends of the bars 10 are rigidly fastened, as by rivets 12, to the outer sides of a pair of flat rings 13 which extend concentric with the rim 8 and parallel with each other and spaced apart as shown in Fig. 2, these bars intermediate their ends being riveted to the outer faces of another pair of flat rings 14 likewise extending concentric with the rim 8 and parallel with each other and spaced apart as shown in Fig. 2, whereby the rim 8 and rings 13 and 14 are rigidly connected together.

The hub-section of the wheel is represented at 15 and is formed of a hub-proper 16 having a fixed flange 17 and a removable flange 18 between which a series of spokes 19 are rigidly confined at their inner ends, as by rivets 20. The spokes 19 which extend through the space between the rings 13 connect at their outer ends with a ring 21 which forms a felly and extends between the bars 10 and when no weight is on the wheel lies within the space between the rings 14 as represented in Fig. 2. The hub-section 15 is supported from the rim 8 through the medium of a series of radially-extending, preferably coiled, springs 22 which are confined between plates 23 and 24 forming spring bearings, the latter being located in the spaces between the spokes and slidable on radially-extending guiding rods 25 arranged in pairs and secured at their outer ends in the ring 21 and at their inner ends in plates 26 spanning the spaces between adjacent spokes and secured to the latter intermediate their ends as represented. The springs 22 surround, at their opposite ends, short cylindrical bosses 27 and 28 on the plates 23 and 24, respectively, and are preferably assembled, with the other parts of the wheel, in relatively high compressed condition. The plates 23 and 24 are provided at opposite sides with flanges 29 and 30 respectively, which are spaced apart a sufficient distance to allow the plates 23 and 24 to seat and bear, under the action of the springs 22, against the outer periphery of the rings 13 and the inner periphery of the rings 14, respectively.

It will be manifest from the foregoing description that when the wheel is in use the hub-section will move downwardly with relation to the rim-section of the wheel against the resistance of the springs 22, the plates 23 coöperating with the springs 22 above the center of the wheel being held against downward movement by engagement with the outer peripheries of the rings 13, whereas the plates 24 move downwardly by reason of their engagement with the inner periphery of the ring 14, thereby compressing these springs between the plates 23 and 24. The plates 24 coöperating with the springs 22 below the center of the wheel are held against downward movement by engagement with the inner peripheries of the rings 21, whereas the plates 23 are moved downward by engagement with the plates 26 on the hub-section, thereby compressing these springs. In the movement of the plates 23 and 24 as described, the rods 25 are moved through those of the plates 23 and 24 which are thus held against radial movement.

It will be understood that in the operation of the wheel in rolling over the ground the greatest stress is imposed upon the springs 22 as they are successively moved into a position immediately above and below the axis of the wheel; and that the weight upon the hub-section of the wheel instead of being resisted by springs operating in opposite directions, is resisted by springs operating in the same direction, viz., in the preferred arrangement illustrated, in a direction for compressing the springs.

The flanges 29 and 30 on the plates 23 and 24, respectively, by reason of their engagement with the rings 13 and 14 serve to hold these rings against spreading under lateral strain exerted against the wheel-sections, as in the case of skidding of the vehicle equipped with the wheels, and thereby preserve alinement of the parts of the wheel and insure its stability.

While I have illustrated and described a particular embodiment of my invention, I do not wish to be understood as intending to limit it to such embodiment, as the structure shown may be materially modified and altered without departing from the spirit of my invention.

What I claim as new, and desire to secure by Letters Patent, is—

1. In a cushioning wheel, an outer rim section, an inner ring section concentric with said outer section, means securing said outer rim and inner ring sections in rigid relation to each other, a hub section comprising spokes and a felly, bearings located intermediate said spokes, bearings on said ring section, and springs mounted between the said bearings, for the purpose set forth.

2. In a cushioning wheel, an outer rim section, an inner ring section concentric with said outer section, means securing said outer rim and inner ring sections in rigid relation to each other, a hub section comprising spokes and a felly, bearings located intermediate said spokes, bearings on said ring section, springs mounted between the said bearings, and radially extending guiding means between said bearings.

3. A vehicle-wheel comprising, in combination, a hub-section formed peripherally with a ring and intermediate the latter and the wheel-axis with an annular series of stops, a rim-section guidedly confined on said hub-section and formed of a tread-section and rings of different diameters connected together, radially-extending rods engaging with said ring-section and stops, an outer annular series and an inner annular series of plates interposed between said ring-section, stops and rings, engaging with said rods for guidance, and springs confined between said plates, for the purpose set forth.

4. A vehicle-wheel comprising, in combination, a hub-section provided peripherally with a ring and intermediate the latter and the wheel-axis with a series of stops, a rim-section guidedly confined on said hub-section and formed of a tread-section and pairs of rings of different diameters connected together and with said tread-section, the members of each pair being spaced apart and overlapping said hub-section, an outer and an inner series of spring-engaging members interposed between said first-named ring and stops and the rings on said rim-section, springs confined between said spring-engaging members, and radial guides on the wheel coöperating with said spring-engaging members, for the purpose set forth.

LAWRENCE HOSKINS.

In presence of—
A. U. THORIEN,
R. A. SCHAEFER.